(12) United States Patent
Kim

(10) Patent No.: US 8,472,968 B1
(45) Date of Patent: Jun. 25, 2013

(54) LOCATION-BASED DETECTION OF INTERFERENCE IN CELLULAR COMMUNICATIONS SYSTEMS

(75) Inventor: Kyungho Kim, Santa Clara, CA (US)

(73) Assignee: Marvell International Ltd., Hamilton (BM)

(*) Notice: Subject to any disclaimer, the term of this patent is extended or adjusted under 35 U.S.C. 154(b) by 463 days.

(21) Appl. No.: 12/534,361

(22) Filed: Aug. 3, 2009

Related U.S. Application Data

(60) Provisional application No. 61/087,842, filed on Aug. 11, 2008.

(51) Int. Cl.
*H04W 52/04* (2009.01)

(52) U.S. Cl.
USPC ............ 455/452.2; 455/456.1; 370/232

(58) Field of Classification Search
USPC ...... 455/63.1, 67.13, 68, 452.2, 456.1–456.6, 455/522; 370/231–233, 235
See application file for complete search history.

(56) References Cited

U.S. PATENT DOCUMENTS

| | | | |
|---|---|---|---|
| 4,805,215 A | 2/1989 | Miller | |
| 5,708,656 A | 1/1998 | Noneman et al. | |
| 6,347,091 B1 | 2/2002 | Wallentin et al. | |
| 6,366,622 B1 | 4/2002 | Brown et al. | |
| 6,374,117 B1 | 4/2002 | Denkert et al. | |
| 6,519,461 B1 | 2/2003 | Andersson et al. | |
| 6,553,229 B1 | 4/2003 | Dent | |
| 6,640,308 B1 | 10/2003 | Keyghobad et al. | |
| 6,675,328 B1 | 1/2004 | Krishnamachari et al. | |
| 6,934,566 B2 | 8/2005 | Kang et al. | |
| 6,946,950 B1 | 9/2005 | Ueno et al. | |
| 6,954,708 B2 | 10/2005 | Rakshani et al. | |
| 7,079,811 B2 | 7/2006 | Lee et al. | |
| 7,173,431 B1 | 2/2007 | Lo et al. | |
| 7,206,840 B2 | 4/2007 | Choi et al. | |
| 7,257,095 B2 | 8/2007 | Liu | |
| 7,355,416 B1 | 4/2008 | Darshan | |
| 7,377,441 B2 | 5/2008 | Wiklof et al. | |
| 7,403,018 B1 | 7/2008 | Lo et al. | |
| 7,659,003 B2 | 2/2010 | Aoki et al. | |
| 7,826,411 B2 | 11/2010 | Gonikberg et al. | |
| 7,849,333 B2 | 12/2010 | Schindler | |
| 7,876,786 B2 | 1/2011 | Bahl et al. | |
| 7,881,746 B2 | 2/2011 | Desai | |
| 7,936,714 B1 | 5/2011 | Karr et al. | |
| 7,995,544 B2 | 8/2011 | Benveniste | |

(Continued)

FOREIGN PATENT DOCUMENTS

| | | |
|---|---|---|
| CN | 102067689 | 5/2011 |
| JP | 200728568 | 2/2007 |

(Continued)

OTHER PUBLICATIONS

"Advisory Action", U.S. Appl. No. 12/190,251, (Dec. 7, 2011), 3 pages.

(Continued)

*Primary Examiner* — Kamran Afshar
*Assistant Examiner* — Khawar Iqbal

(57) ABSTRACT

The present specification describes techniques and apparatus that enable location-based detection of interference. In one or more implementations, a neighboring cell generating interference for a mobile device is determined based at least in part on a location of the mobile device.

17 Claims, 4 Drawing Sheets

U.S. PATENT DOCUMENTS

| | | | |
|---|---|---|---|
| 8,000,715 | B2 | 8/2011 | Melpignano et al. |
| 8,060,017 | B2 | 11/2011 | Schlicht et al. |
| 8,107,391 | B2 | 1/2012 | Wu et al. |
| 8,150,328 | B2 | 4/2012 | Chaudhri et al. |
| 8,204,015 | B2 | 6/2012 | Chaudhri et al. |
| 8,275,314 | B1 | 9/2012 | Lin |
| 8,315,564 | B2 | 11/2012 | Banerjea |
| 8,364,188 | B2 | 1/2013 | Srinivasan et al. |
| 8,369,782 | B1 | 2/2013 | Lin et al. |
| 2003/0198200 | A1 | 10/2003 | Diener et al. |
| 2004/0063403 | A1 | 4/2004 | Durrant |
| 2004/0110470 | A1 | 6/2004 | Tsiden et al. |
| 2004/0214575 | A1* | 10/2004 | Jovanovic ............ 455/444 |
| 2005/0058151 | A1 | 3/2005 | Yeh |
| 2005/0120119 | A1 | 6/2005 | Bhanu et al. |
| 2006/0063509 | A1 | 3/2006 | Pincu et al. |
| 2006/0128308 | A1 | 6/2006 | Michael et al. |
| 2006/0189359 | A1 | 8/2006 | Kammer et al. |
| 2006/0239443 | A1 | 10/2006 | Oxford et al. |
| 2006/0281404 | A1 | 12/2006 | Lee et al. |
| 2007/0081553 | A1 | 4/2007 | Cicchetti et al. |
| 2007/0103829 | A1 | 5/2007 | Darshan et al. |
| 2007/0280471 | A1 | 12/2007 | Fallahi et al. |
| 2008/0027033 | A1 | 1/2008 | Gonda et al. |
| 2008/0076466 | A1 | 3/2008 | Larsson |
| 2008/0129118 | A1 | 6/2008 | Diab |
| 2008/0310067 | A1 | 12/2008 | Diab et al. |
| 2009/0005061 | A1* | 1/2009 | Ward et al. ............ 455/456.1 |
| 2009/0168686 | A1* | 7/2009 | Love et al. ............ 370/312 |
| 2009/0168725 | A1* | 7/2009 | Mishra ............ 370/331 |
| 2009/0170497 | A1* | 7/2009 | Miao et al. ............ 455/422.1 |
| 2009/0190541 | A1 | 7/2009 | Abedi |
| 2009/0202013 | A1* | 8/2009 | Sebastian ............ 375/260 |
| 2009/0291640 | A1* | 11/2009 | Bhattad et al. ............ 455/63.1 |
| 2009/0311961 | A1 | 12/2009 | Banerjea |
| 2009/0312027 | A1* | 12/2009 | Foschini et al. ............ 455/446 |
| 2010/0009675 | A1 | 1/2010 | Wijting et al. |
| 2010/0082957 | A1* | 4/2010 | Iwata ............ 713/1 |
| 2010/0097952 | A1 | 4/2010 | McHenry et al. |
| 2010/0103867 | A1* | 4/2010 | Kishiyama et al. ............ 370/320 |
| 2010/0216497 | A1* | 8/2010 | Kawasaki ............ 455/501 |
| 2010/0248734 | A1* | 9/2010 | Yamazaki et al. ............ 455/452.2 |
| 2010/0303026 | A1 | 12/2010 | Chaudhri et al. |
| 2011/0164538 | A1 | 7/2011 | Karr et al. |
| 2013/0045687 | A1 | 2/2013 | Banerjea |
| 2013/0045688 | A1 | 2/2013 | Banerjea |

FOREIGN PATENT DOCUMENTS

| | | |
|---|---|---|
| JP | 2007028568 | 2/2007 |
| WO | WO-0178252 | 10/2001 |
| WO | WO-02091623 | 11/2002 |

OTHER PUBLICATIONS

"Final Office Action", U.S. Appl. No. 12/190,251, (Sep. 13, 2011), 15 pages.

"Foreign Office Action", EP Application No. 09789754.0, (May 17, 2011), 8 pages.

"Information Technology—Telecommunications and Information Exchange between Systems—Local and Metropolitan Area Networks—Specific Requirements", *Part 11: Wireless LAN Medium Access Control (MAC) and Physical Layer (PHY) Specifications*, IEEE Standard 802.11h-2003 (Amendment to IEEE Std 802.11-1993), (Oct. 14, 2003), 80 pages.

"Non-Final Office Action", U.S. Appl. No. 12/190,240, (Jan. 6, 2012), 7 pages.

"Non-Final Office Action", U.S. Appl. No. 12/190,251, (Mar. 29, 2011), 8 pages.

"Non-Final Office Action", U.S. Appl. No. 12/323,292, (Dec. 21, 2011), 17 pages.

"Non-Final Office Action", U.S. Appl. No. 12/478,446, (Dec. 18, 2011), 17 pages.

"Part 11: Wireless LAN Medium Access Control (MAC) and Physical Layer (PHY) specifications", *Information technology—Telecommunications and information exchange between systems—Local and metroplitan area networks—Specific requirements—*, IEEE, (Apr. 2003), pp. 1-69.

"PCT Search Report", Application No. PCT/US2009/046289, (Oct. 29, 2009), 13 pages.

Jung, Eun-Sun et al., "A Power Control MAC Protocol for Ad Hoc Networks", *Wireless Networks; The Journal of Mobile Communication, Computation, and Information*, vol. 11, No. 1-2, Kluwer Academic Publishers, (Jan. 1, 2005), pp. 55-66.

"Final Office Action", U.S. Appl. No. 12/323,292, Aug. 24, 2012, 26 pages.

"Foreign Office Action", European Patent Application No. 09789754.0, (Jul. 12, 2012), 4 pages.

"Notice of Allowance", U.S. Appl. No. 12/190,240, (May 16, 2012), 4 pages.

"Notice of Allowance", U.S. Appl. No. 12/478,446, (Jun. 14, 2012), 6 pages.

"Non-Final Office Action", U.S. Appl. No. 12/190,251, (Mar. 29, 2012), 11 pages.

"Foreign Office Action", Japanese Application No. 2011-513586, Oct. 23, 2012, 7 pages.

"Non-Final Office Action", U.S. Appl. No. 12/759,336, Oct. 4, 2012, 13 pages.

"Notice of Allowance", U.S. Appl. No. 12/190,251, Oct. 4, 2012, 6 pages.

"Final Office Action", U.S. Appl. No. 12/759,336, Feb. 25, 2013, 11 pages.

"Non-Final Office Action", U.S. Appl. No. 13/656,482, Mar. 19, 2013, 19 pages.

"Non-Final Office Action", U.S. Appl. No. 13/656,502, Feb. 21, 2013, 6 pages.

"Non-Final Office Action", U.S. Appl. No. 13/604,563, Apr. 5, 2013, 6 pages.

"Foreign Office Action", Chinese Application No. 200980122587.0, (Feb. 21, 2013), 17 pages.

"Foreign Office Action", Japanese Application No. 2011-513586, (Apr. 9, 2013), 4 Pages.

"Notice of Allowance", U.S. Appl. No. 12/759,336, (May 3, 2013), 9 pages.

* cited by examiner

LOCATION-BASED DETECTION OF INTERFERENCE IN CELLULAR COMMUNICATIONS SYSTEMS

RELATED APPLICATIONS

This application claims priority under 35 U.S.C. §119(e) to U.S. Provisional Patent Application Ser. No. 61/087,842, filed on Aug. 11, 2008, the disclosure of which is incorporated by reference herein in its entirety.

BACKGROUND

Use of cellular devices has become commonplace. Generally, in a cellular communications system, multiple base stations are set up that each provide a separate area of coverage. Each separate area of coverage is commonly referred to as a cell. Mobile devices that are physically located within a particular cell communicate with the base station responsible for that cell. Situations can arise, however, in which signals from a mobile device physically located in one cell are received by a base station responsible for a different cell. These signals can be a source of interference for other mobile devices communicating with that base station.

SUMMARY

A method implemented in a first cellular base station located within a cell is described. The method includes analyzing signals received from a mobile device to identify when interference for the mobile device exceeds a threshold amount, the mobile device being managed by the first cellular base station. The method further includes, in response to the interference for the mobile device exceeding the threshold amount, determining a location of the mobile device in the cell, and determining a neighboring cell generating the interference for the mobile device based on the location of the mobile device in the cell.

A computing device of a cellular base station is also described. The computing device includes a communicator to receive signals from multiple mobile devices being managed by the cellular base station; an analyzer to analyze the signals and identify when signals from one or more of the multiple mobile devices are being interfered with by greater than a threshold amount; and a locator to determine, based on a location of the one or more mobile devices, a cell responsible for the interference.

Another method implemented in a first cellular base station is also described, and includes identifying when interference in signals received from a mobile device exceeds a threshold amount, the mobile device being located in a first cell being managed by the first cellular base station; determining a second cell closest to the mobile device; and requesting that a second cellular base station that manages the second cell attempt to reduce the interference.

BRIEF DESCRIPTION OF THE DRAWINGS

The same numbers are used throughout the drawings to reference like features.

DETAILED DESCRIPTION

Location-based detection of interference in cellular communications systems is discussed herein. Generally, a base station responsible for managing mobile devices for a cell in a cellular communications system analyzes signals received from the mobile devices that base station is managing. The base station determines, based on a signal-to-noise ratio value or other interference measurement calculated for signals received from a mobile device, whether interference in the signal received from the mobile device exceeds a threshold amount. This threshold amount can be exceeding of a particular value for a particular amount of time. If the interference exceeds the threshold amount, then the base station determines that the mobile device is being interfered with by one or more mobile devices in another cell. In response, the base station determines a closest neighboring cell of the mobile device being interfered with, and communicates a request to the base station responsible for managing mobile devices in that neighboring cell. The request that is sent requests that the base station responsible for managing mobile devices in that neighboring cell reduce the interference being generated by the mobile devices in that neighboring cell.

Figure 1:
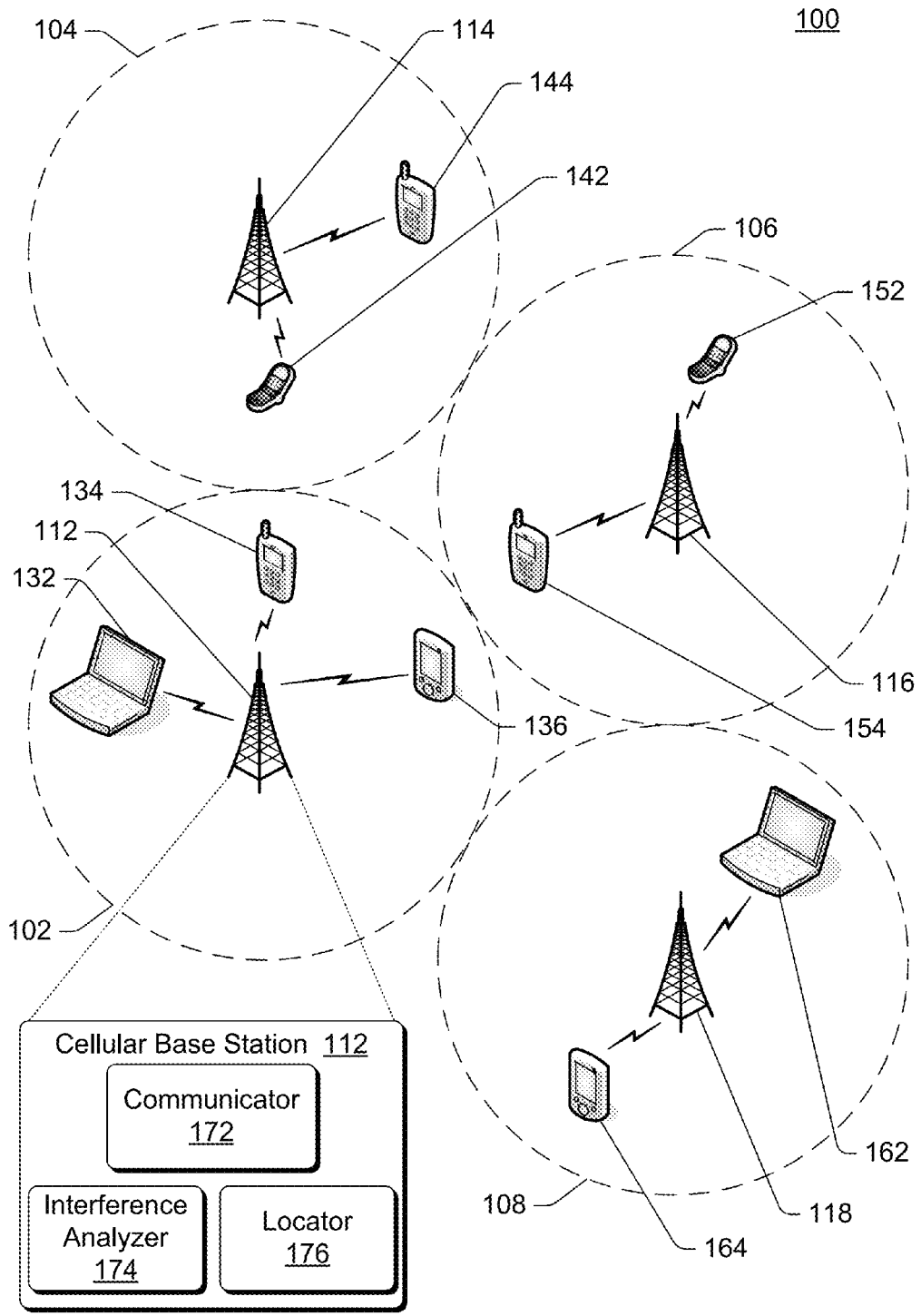
FIG. 1 illustrates an example cellular communications system implementing the location-based detection of interference in cellular communications systems.

FIG. 1 illustrates an example cellular communications system 100 implementing the location-based detection of interference in cellular communications systems in accordance with one or more embodiments. System 100 includes four cells 102, 104, 106, and 108. For ease of explanation, only four cells are illustrated in FIG. 1. However, cellular communications system 100 can include a different number of cells. A cellular communications system 100 can be implemented using a variety of different conventional technologies and/or protocols, such as any of the GSM (Global System for Mobile Communications)-based systems, CDMA (Code Division Multiple Access)-based systems, AMPS (Advanced Mobile Phone System)-based systems, and so forth.

Within each cell 102, 104, 106, and 108 is a cellular base station 112, 114, 116, and 118, respectively. Each cell represents a geographic or physical area covered or managed by the cellular base station within that cell. The size and shape of each cell can vary based on, for example, the technologies and/or protocols used by the cellular base stations, the power of the cellular base stations, the physical terrain of the area covered by the cellular base station, interfering signals received from other sources within and/or external to the cell, and so forth.

Mobile devices are located within different cells and can move between cells. In the example of FIG. 1, mobile devices 132, 134, and 136 are located within cell 102, mobile devices 142 and 144 are located within cell 104, mobile devices 152 and 154 are located within cell 106, and mobile devices 162 and 164 are located within cell 108. Each of these mobile devices can be a variety of different computing devices capable of wireless communication with a cellular base station. For example, a mobile device can be a cellular phone, a car phone, a personal digital assistant (PDA), a laptop or other portable computer, an automotive PC, and so forth. Additionally, the mobile devices are referred to as being mobile due to their ability to maintain communication with a cellular base station of system 100 as the mobile devices transition from one cell to another. However, such mobile devices need not be moved and can remain stationary in a particular location.

The cellular base station in a cell is responsible for handling or managing mobile devices in that cell. The managing of a mobile device refers to the cellular base station coordinating various communications desired by the mobile device. These communications can take a variety of different forms, such as phone calls, email or other messages, Internet or other network data transfers, and so forth. As part of managing a mobile device, the cellular base station receives data from the mobile device and forwards such data to the appropriate destination, and also receives data targeting the mobile device and communicates such data to the mobile device. To facilitate these communications, the managing provided by the cellular base station also includes communicating control information to the mobile device and/or receiving control information from the mobile device.

As a mobile device moves within a cell, the cellular base station for that cell maintains responsibility for managing that mobile device. However, when a mobile device moves into a neighboring cell, responsibility for managing that mobile device is transferred to the cellular base station of that neighboring cell. For example, as a mobile device moves within cell 102, responsibility for managing a mobile device remains with cellular base station 112. However, if the mobile device were to move into cell 108, then responsibility for managing the mobile device is transferred to cellular base station 118. The cellular base stations communicate with one another to coordinate such transfers of responsibility.

Although cells are not illustrated as overlapping in FIG. 1, it is to be appreciated that different cells in cellular communications system 100 can overlap one another. The cellular base stations responsible for managing mobile devices within overlapping cells communicate with one another and determine, in accordance with the protocol implemented by cellular communications system 100, which of the cellular base stations is responsible for managing the mobile device in an area that is overlapped by multiple cells.

Cellular base stations can support a variety of different protocols and/or techniques to allow such requests and other information to be communicated among the cellular base stations. In one or more embodiments, requests and other information can be communicated among the cellular base stations via an X2 link protocol supported by cellular base stations using the 3GPP LTE ($3^{rd}$ Generation Partnership Project Long Term Evolution) standard.

Each mobile device in a cell communicates with the cellular base station for that cell. This communication includes the mobile device sending signals to the cellular base station (also referred to as an uplink), as well as receiving signals from the cellular base station (also referred to as a downlink). Although a particular cellular base station expects to receive signals from mobile devices that the cellular base station is responsible for managing, situations can arise in which a cellular base station also receives signals from other mobile devices in other cells that the cellular base station is not responsible for managing. Signals received by a cellular base station from a mobile device that the cellular base station is not responsible for managing are also referred to as interference for the cellular base station as such signals can interfere with the signals received from mobile devices that the cellular base station is responsible for managing. For example, cellular base station 112 is responsible for managing mobile devices 132, 134, and 136. However, cellular base station 112 can also receive signals sent by other mobile devices, such as mobile device 142 and 154. Signals that cellular base station 112 receives from mobile devices 142 and 154 are referred to as interference (from the perspective of cellular base station 112, mobile device 136, and cell 102).

A cellular base station employs an interference detection technique to detect which other surrounding cell(s) include mobile devices that are causing interference to a mobile device managed by the cellular base station. For example, if cellular base station 112 detects that signals received from mobile device 136 are being interfered with by a threshold amount, then cellular base station 112 detects which other cell 104, 106, or 108 includes one or more mobile devices that are generating this interference.

FIG. 1 illustrates cellular base station 112 in additional detail. Only one cellular base station is shown in additional detail in FIG. 1 in order to avoid cluttering the drawings, although it is to be appreciated that the other cellular base stations 114, 116, and 118 are analogous to cellular base station 112. Cellular base station 112 includes a communicator 172, an interference analyzer 174, and a locator 176. Communicator 172, interference analyzer 174, and locator 176 can be implemented in software, firmware, hardware, or combinations thereof.

Communicator 172 manages communications with mobile devices in cell 102 as well as communications with cellular base stations in other cells. Communicator 172 manages receiving signals from mobile devices in cell 102, sending signals to mobile devices in cell 102, receiving requests from cellular base stations in other cells, sending requests to cellular base stations in other cells, and so forth.

During operation, communicator 172 generates measurements of interference in the signals received from each of the mobile devices in cell 102. In one or more embodiments, these measurements of interference are signal-to-noise ratio (SNR) measurements, each of which is a measure of the power of the intended signal from a mobile device relative to interference with that intended signal when the signal is received. The signal-to-noise ratio measurements can be generated using conventional techniques, and are used by communicator 172 in managing the mobile devices in cell 102. Additionally, the signal-to-noise ratio measurements (or other measures of interference generated by communicator 172) are leveraged by the location-based detection of interference in cellular communications systems and used to reduce interference in certain situations as discussed in more detail below.

Interference analyzer 174 obtains the measurements of interference (e.g., signal-to-noise ratio measurements) generated by communicator 172 for the mobile devices in cell 102 and analyzes these obtained measurements. In one embodiment, analyzer 174 analyzes these obtained measurements of interference and determines when the interference for a particular mobile device exceeds a threshold amount. The interference can be determined to exceed the threshold amount when, for example, the interference exceeds a particular value for a particular amount of time.

In situations when interference analyzer 174 determines that the interference for a particular mobile device exceeds the threshold amount, locator 176 determines the neighboring cell that is responsible for the interference. The neighboring cell that is responsible for the interference is the neighboring cell that includes one or more mobile devices that are sending signals that are causing interference. This neighboring cell is determined based at least in part on the location of the particular mobile device for which measurements of interference exceeds a threshold amount, as discussed in more detail below.

With the neighboring cell that is responsible for the interference having been determined, communicator 172 sends a request to the cellular base station responsible for managing mobile devices in that neighboring cell. This request is a request for the cellular base station responsible for managing devices in that neighboring cell to take action to reduce the interference being generated by the devices in that neighboring cell.

In addition to communicator 172, interference analyzer 174, and locator 176, cellular base station 112 can include various additional well-known components and/or modules. These additional components and/or modules provide various functionality for cellular base station 112 in managing mobile devices in cell 102. These additional components and/or modules, however, have not been shown in FIG. 1 in order to avoid cluttering the drawings.

Figure 2:
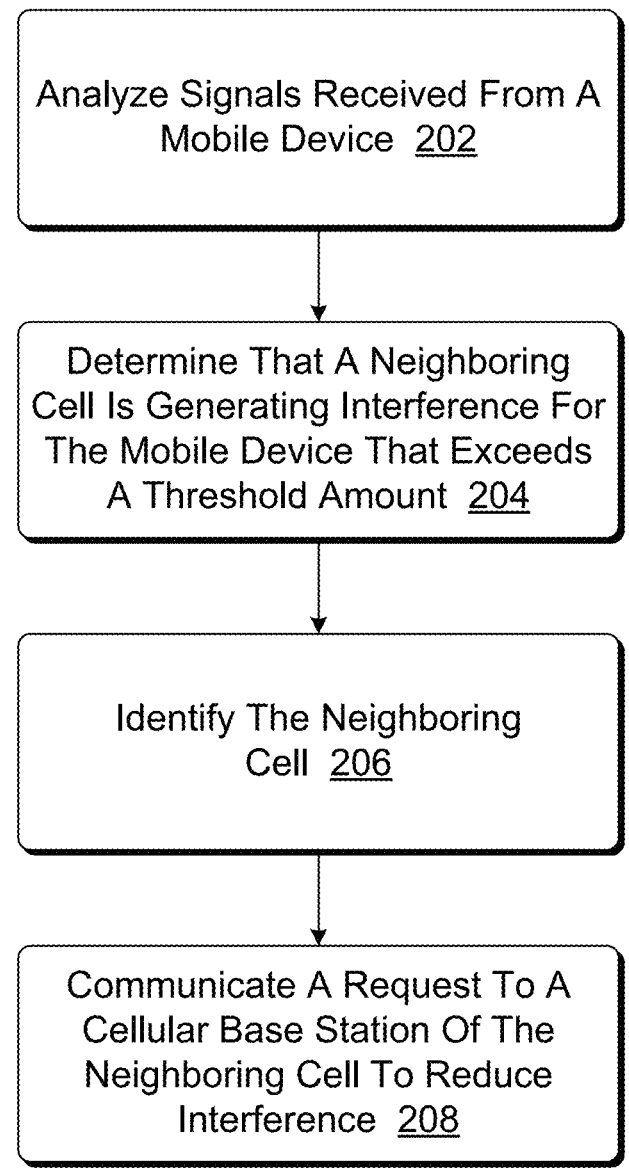
FIG. 2 is a flowchart illustrating an example process for implementing the location-based detection of interference in cellular communications systems.

FIG. 2 is a flowchart illustrating an example process 200 for implementing the location-based detection of interference in cellular communications systems in accordance with one or more embodiments. Aspects of process 200 may be implemented in hardware, firmware, software, or a combination thereof. Process 200 is described in the form of a set of blocks that specify operations to be performed, and the operations are not necessarily limited to the order shown. The operations performed by the set of blocks in process 200 are performed by a cellular base station, such as a cellular base station 112, 114, 116, or 118 of FIG. 1. Process 200 is discussed with additional reference to FIG. 1.

At block 202 an interference analyzer (such as interference analyzer 174 of FIG. 1) analyzes signals received from a mobile device. The analysis in block 202 is an analysis of the measurements of interference (e.g., the signal-to-noise ratio measurements) obtained from a communicator (such as communicator 172 of FIG. 1). In one or more embodiments, the analysis in block 202 is performed for each mobile device that the cellular base station implementing process 200 is responsible for managing, although alternatively the analysis in block 202 may not be performed for certain mobile devices.

The analysis in block 202 determines whether the interference for the mobile device exceeds a threshold amount. In one or more embodiments, the analysis in block 202 includes determining if the measurements of interference for the mobile device obtained from the communicator indicate that the interference exceeds a particular value for a particular amount of time. This particular amount of time can vary, for example, by being dependent on how much the interference exceeds the particular value and/or whether interference for other mobile devices also exceeds the particular value. For example, if the interference exceeds the particular value by greater than a certain percentage or certain amount, then the particular amount of time can be reduced. By way of another example, if multiple other mobile devices (optionally other mobile devices within a threshold distance of the mobile device) also have measurements of interference that exceed the particular value, then the particular amount of time can be reduced.

Based on the analysis in block 202, at block 204 the interference analyzer determines when a neighboring cell is generating interference for a mobile device that exceeds the threshold amount. The interference analyzer makes this determination in one or more of a variety of different manners. In one or more embodiments, the interference analyzer determines that a neighboring cell is generating interference for a mobile device that exceeds a threshold amount when the interference analyzer determines in block 202 that the measurements of interference obtained from the communicator for the mobile device exceed a particular value for a particular amount of time. This particular amount of time is identified in one or more of a variety of different manners, such as a particular number of consecutive interference measurements exceeding the particular value, or a particular percentage (e.g., one-half or two-thirds) of a particular number of consecutive interference measurements exceeding the particular value.

At block 206, a locator (such as locator 176 of FIG. 1) identifies the particular neighboring cell that is generating the interference. The locator identifies the neighboring cell that is generating the interference based on the location of the mobile device for which the interference exceeding the threshold amount was determined to have been generated. In one or more embodiments, the locator identifies the neighboring cell that is closest to the mobile device for which the interference has been determined to exceed a threshold amount as the neighboring cell that is generating the interference. The locator identifies this neighboring cell that is closest to the mobile device in one or more of a variety of different manners. Typically, the locator is aware of the location of each mobile device in cell 102 that cellular base station 112 is responsible for managing. The locator identifies the particular location of a mobile device in cell 102 in one or more of a variety of different manners, such as by tracking (e.g., triangulating on) the signals sent by the mobile device, receiving an indication of the location of the device (e.g., global positioning system (GPS) coordinates) from the device, and so forth. The locator can track these locations, or alternatively can access another component or module that tracks or otherwise obtains these locations.

Additionally, the locator is aware of the topology of the cells in cellular communications system 100. This topology refers to the locations of the different cells (and/or cellular base stations) in system 100. The locator identifies this topology in a variety of different manners, such as by obtaining an indication of the topology from an administrator or developer of system 100, by obtaining identifications of the locations of the cellular base stations from the cellular base stations, and so forth.

Given the location of the mobile device for which the interference has been determined to exceed the threshold amount and the topology of the cells in cellular communications system 100, the locator readily identifies the neighboring cell that is physically closest to the mobile device for which the interference has been determined to exceed the threshold amount. The locator makes this identification, for example, by identifying the cell (or cellular base station) that is physically closest to the mobile device for which the interference has been determined to exceed the threshold amount.

In other embodiments, the locator identifies the neighboring cell that is closest to the mobile device in other manners. For example, the locator can identify the neighboring cell that is closest to the mobile device based on a direction. The locator identifies the location of the mobile device for which the interference has been determined to exceed the threshold amount as discussed above. Additionally, the locator identifies a direction of that mobile device from the cellular base station responsible for managing the device (e.g., cellular base station 112). The locator knows the location of the cellular base station, and given the location of the mobile device the locator readily identifies this direction. Based on the topology of the cells in cellular communications system 100 and following a path from the cellular base station to the mobile device and continuing beyond the mobile device, the locator determines that the next cell encountered in that direction is the neighboring cell that is generating the interference.

In block 208, the communicator sends a request to the cellular base station of the neighboring cell identified in block 206 to reduce the interference. In one or more embodiments, the request to reduce interference is also referred to as an overload indicator (OI). In response to the request, the cellular base station receiving the request can attempt to reduce the interference by altering the operation of one or more of the mobile devices it manages in a variety of different conventional manners. For example, the cellular base station can attempt to reduce interference by requesting that one or more mobile devices in the cell managed by the cellular base station reduce their transmitting power, by altering the scheduling of when signals are sent by one or more mobile devices in the cell managed by the cellular base station, and so forth.

The cellular base station receiving the request can attempt to reduce interference from all mobile devices in the cell managed by that cellular base station, or alternatively only in particular mobile devices. For example, the cellular base station receiving the request can identify one or more mobile devices in the cell managed by that cellular base station that are close to (e.g., within a particular distance of) a cell managed by the cellular base station from which the request was received. The cellular base station receiving the request readily identifies the mobile devices close to the cell based on the location of those mobile devices as well as the topology of the cells in the cellular communications system and the cellular base station from which the request to reduce interference was received. A cellular base station can attempt to reduce interference from mobile devices that are within a threshold distance of the cell managed by the cellular base station from which the request was received, but not from other mobile devices. For example, if cellular base station 116 receives a request from cellular base station 112 to reduce interference, cellular base station 116 can attempt to reduce interference from mobile device 154 (which can be determined as being close to cell 102). However, cellular base station 112 need not attempt to reduce interference from mobile device 152 (e.g., the operation of mobile device 152 can remain unchanged).

Figure 3:
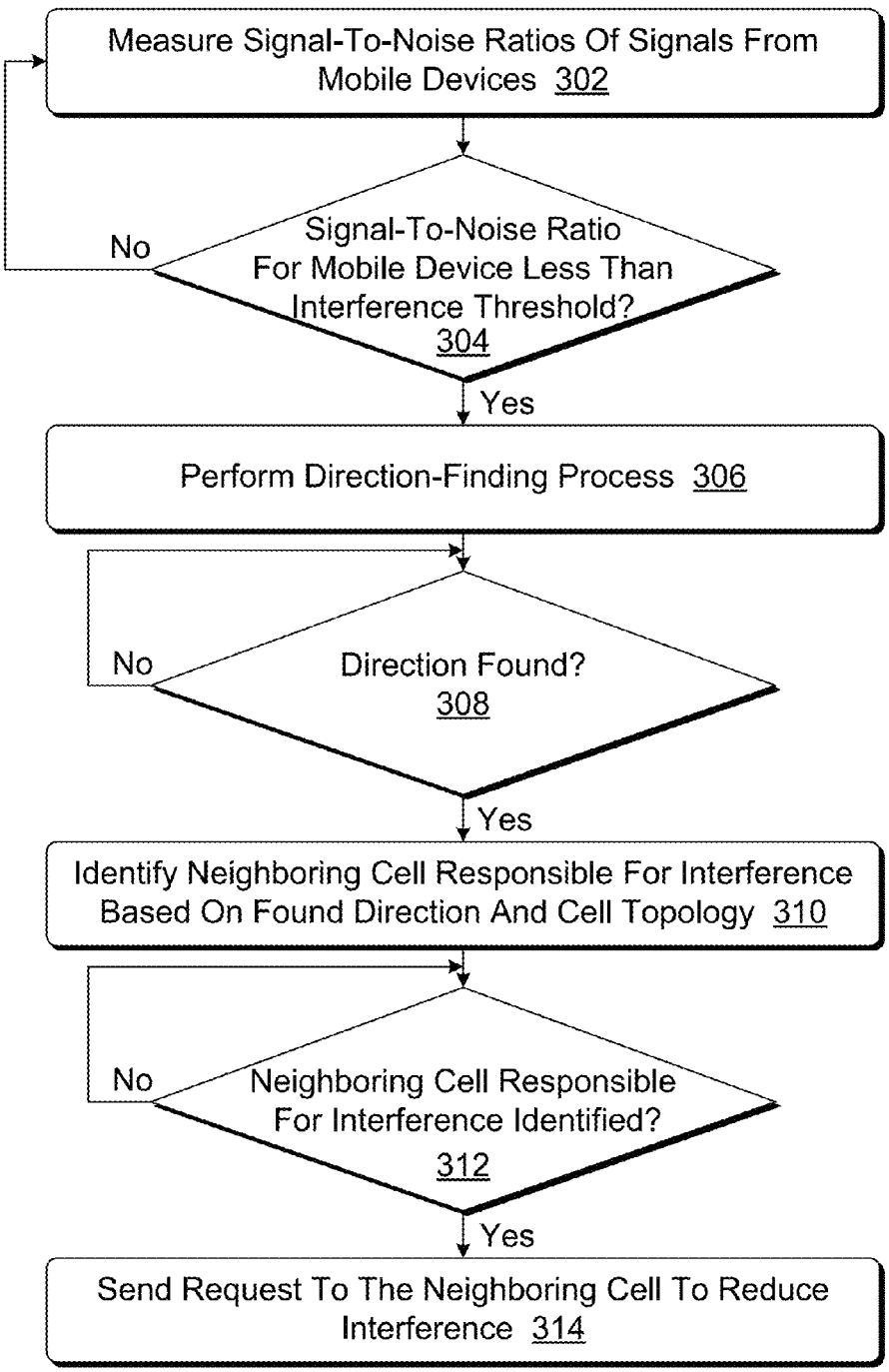
FIG. 3 is a flowchart illustrating another example process for implementing the location-based detection of interference in cellular communications systems.

FIG. 3 is a flowchart illustrating another example process 300 for implementing the location-based detection of interference in cellular communications systems in accordance with one or more embodiments. Aspects of process 300 may be implemented in hardware, firmware, software, or a combination thereof. Process 300 is described in the form of a set of blocks that specify operations to be performed, and the operations are not necessarily limited to the order shown. The operations performed by the set of blocks in process 300 are performed by a cellular base station, such as a cellular base station 112, 114, 116, or 118 of FIG. 1. Process 300 is discussed with additional reference to FIG. 1.

In block 302, a communicator (such as communicator 172 of FIG. 1) measures signal-to-noise ratios of signals received from mobile devices.

In block 304, an interference analyzer (such as interference analyzer 174 of FIG. 1) checks whether the signal-to-noise ratio measurement for a mobile device is less than an interference threshold. It is to be appreciated that higher signal-to-noise ratio measurements indicate less interference than lower signal-to-noise ratio measurements. Accordingly, the signal-to-noise ratio being less than an interference threshold indicates that the interference exceeds a threshold amount.

The interference threshold is one or more of a variety of different values that are established in a variety of different manners that vary by implementation. In one or more embodiments, a particular interference threshold is established by weighing the desire to detect interference from one or more mobile devices of one or more neighboring cells against the desire to avoid false positives (e.g., avoiding identifying interference from another source as being interference from or more mobile devices of one or more neighboring cells). For example, the interference threshold can be determined empirically based on administrators or other users or devices analyzing the operation of the cellular base stations and signals received from the mobile devices.

Additionally, in one or more embodiments the interference analyzer determines that the signal-to-noise ratio is less than the interference threshold 304 based on multiple measurements of signals received from a mobile device. The frequency with which signal-to-noise ratio measurements are made can vary based on the technology and/or protocol implemented by the cellular base station. For example, the signal-to-noise ratio measurements can be made 15 times every 10 milliseconds (ms). In order for the signal-to-noise ratio measurements to be less than the interference threshold, the signal-to-noise ratio measurements are to indicate that the interference exceeds a particular value for a particular amount of time. The signal-to-noise ratio measurements can indicate that the interference exceeds a particular value by the signal-to-noise ratio measurements being less than a particular value. This particular amount of time can be, for example, a particular number of consecutive measurements that are to be less than the particular value, at least a particular percentage of consecutive measurements are to be less than the particular value, and so forth. For example, this particular amount of time can indicate that five consecutive signal-to-noise ratio measurements are to be less than the particular value. By way of another example, this particular amount of time can indicate that one-half or two-thirds of any 15 consecutive signal-to-noise ratio measurements are to be less than the particular value. This particular amount of time can also vary as discussed above, such as being dependent on how much the signal-to-noise ratio measurements are below the particular value and/or whether signal-to-noise ratio measurements for other mobile devices are less than the interference threshold.

The interference analyzer checks the signal-to-noise ratio measurements of signals received from the mobile devices until the signal-to-noise ratio measurements for a mobile device are less than the interference threshold. In block 306, when the interference analyzer determines that the signal-to-noise ratio measurements from a mobile device are less than the interference threshold, then a locator (such as locator 176 of FIG. 1) performs a direction-finding process. The direction-finding process identifies a direction, relative to the cellular base station implementing process 300, where the mobile device for which the signal-to-noise ratio measurements were determined to be less than the interference threshold in block 304 is located. This direction is determined based on the location of the cellular base station and the mobile device as discussed above.

The direction-finding process continues until the direction is found. In block 310, the locator identifies the neighboring cell responsible for the interference based on the direction found in block 308 and the cell topology. This neighboring cell is the neighboring cell closest to the mobile device for which the signal-to-noise ratio measurements were determined to be less than the interference threshold in block 304. In block 312, this identification process continues until the locator identifies the neighboring cell responsible for the interference. After the locator identifies the neighboring cell, in block 314 the communicator sends a request to reduce interference to the neighboring cell. The neighboring cell can then act to attempt to reduce the interference in a variety of different manners as discussed above.

Process 300 is discussed above using a direction-based technique in blocks 306-312. Alternatively, other techniques can be used to identify the neighboring cell, such as the cell that is closest to the mobile device for which the signal-to-noise ratio measurements were determined to be less than the interference threshold in block 304 as discussed above.

As can be seen from the discussions herein, the location-based detection of interference in cellular communications systems leverages signals and measurements already being used by the cellular base stations. For example, signal-to-noise ratio measurements that are already being measured by the cellular base stations for other uses can be leveraged for the location-based detection of interference in cellular communications systems. Accordingly, no additional signals need be sent by the mobile devices in order to detect the interference. Rather, the signals otherwise used by the cellular base stations and mobile devices to communicate data and/or control information between one another are leveraged by the location-based detection of interference in cellular communications systems. Additionally, no special actions need be taken by the mobile devices in order to detect the interference, such as no coordinated periods of silence need be performed by the mobile devices in order to detect the interference.

Additionally, as can be seen from the discussions herein the detection of interference in cellular communications systems is location-based. When a cellular base station detects that signals from a mobile device are being interfered with by a threshold amount, the cellular base station identifies the neighboring cell responsible for the interference based on the location of that mobile device. The cellular base station also requests that the cellular base station responsible for managing mobile devices in that neighboring cell attempt to reduce the interference. A broadcast statement to all neighboring cells need not be made; rather, the request can be sent just to the neighboring cell responsible for the interference. Accordingly, other neighboring cells need not attempt to reduce interference generated by mobile devices in those cells.

Figure 4:
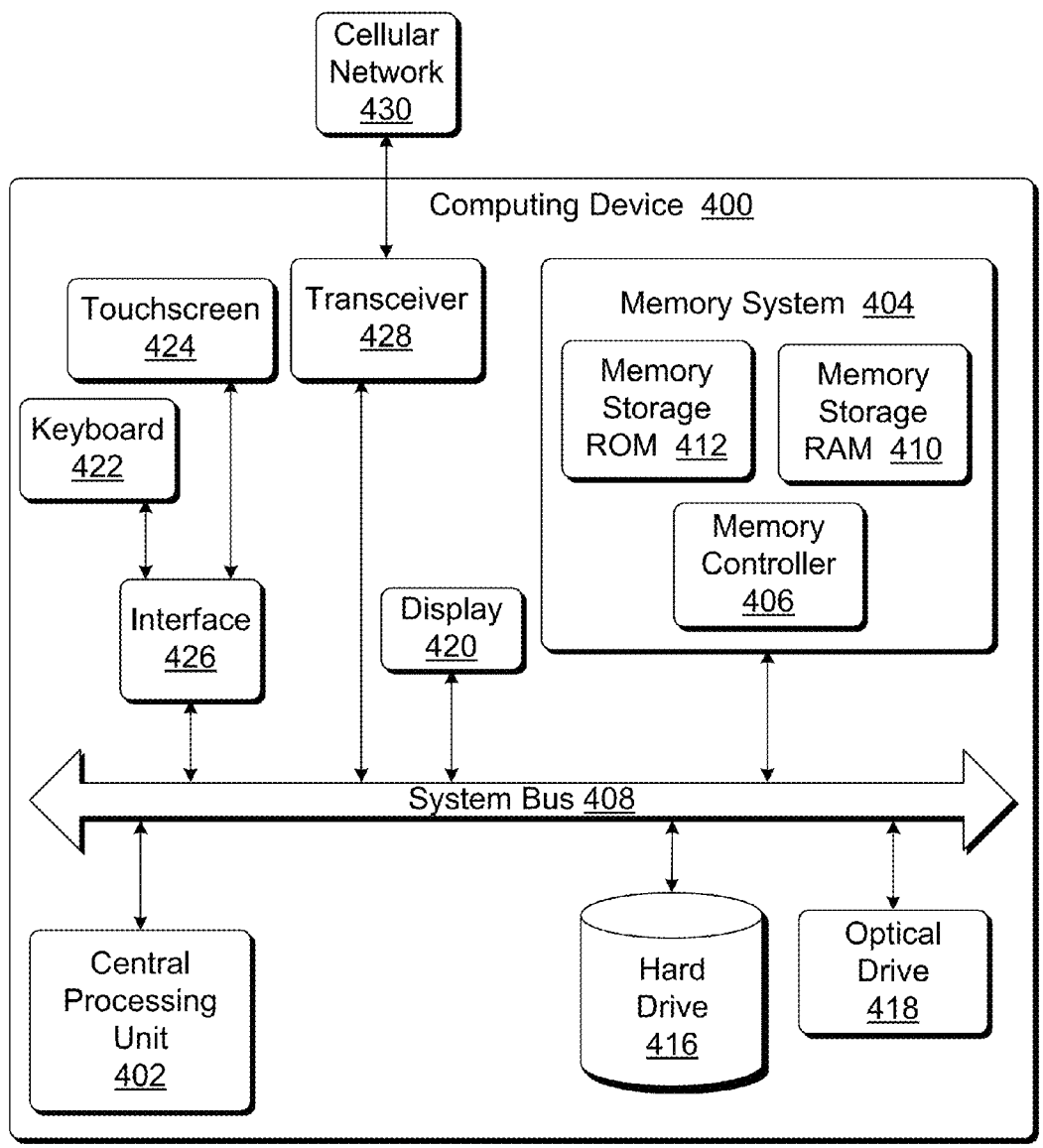
FIG. 4 is a generalized example of a computing device that can be used to implement the location-based detection of interference in cellular communications systems.

FIG. 4 is a generalized example of a computing device 400 that can be used to implement the location-based detection of interference in cellular communications systems in accordance with one or more embodiments. Computing device 400 can implement, for example, a cellular base station of FIG. 1 or portion thereof. For example, computing device 400 can implement communicator 172, interference analyzer 174, and locator 176 of FIG. 1. Computing device 400 can also implement, for example, a mobile device of FIG. 1.

One or more processing units, such as a central processing unit (CPU) 402, are included in computing device 400. A memory system 404 including a memory controller 406, random access memory (RAM) memory storage 410 and read only memory (ROM) memory storage 412 can store instructions and data for execution and use by CPU 402. Suitable bus architectures include a system bus 408, as well as a memory bus for communication between the CPU and memory system 404 via memory controller 406, and a peripheral bus for communication with peripheral devices. Additional hardware including mass data storage (e.g., a hard disk drive (HDD) 416) and an optical drive 418 (e.g., a digital video disk (DVD) drive) may be coupled to the CPU through respective drive interfaces. Input/output devices such as displays 420, keyboards 422, touchscreens 424, and so forth may be coupled via a video adapter in the former case and various serial or parallel interfaces 426 in the latter two cases. Example input/output interfaces include serial ports, parallel ports, universal serial buses (USB), video adapters, etc. Other hardware can be included in a similar fashion. One or more transceivers 428 can be included for communicating with other devices via one or more cellular network(s) 430.

Although the subject matter has been described in language specific to structural features and/or methodological operations, it is to be understood that the subject matter defined in the appended claims is not necessarily limited to the specific features or acts described above, including orders in which they are performed.

What is claimed is:

1. A method implemented in a first cellular base station located within a cell, the method comprising:
   measuring, at the first cellular base station, signal-to-noise ratios of uplink signals received from multiple mobile devices to identify that interference for the multiple mobile devices exceeds a threshold amount when the signal-to-noise ratios are less than an interference threshold, the multiple mobile devices being managed by the first cellular base station; and
   in response to the signal-to-noise ratios being less than the interference threshold for at least a particular amount of time,
   determining, by array processing the uplink signals received from the multiple mobile devices, a direction from the first cellular base station to the multiple mobile devices in the cell,
   determining, based on the direction to the multiple mobile devices and a cell topology of a cellular communications system that includes the first cellular base station, a neighboring cell generating the interference for the multiple mobile devices, and
   communicating a request, from the first cellular base station to a second cellular base station managing the neighboring cell, effective to cause the second base station to reduce the interference for the multiple mobile devices.

2. A method as recited in claim 1, wherein the request to the second cellular base station is a request to alter operation of one or more mobile devices managed by the second cellular base station.

3. A method as recited in claim 2, wherein in response to the request, operation of the one or more mobile devices in the neighboring cell close to the cell managed by the first cellular base station are altered, while operation of other mobile devices in the neighboring cell remains unchanged.

4. A method as recited in claim 1, wherein the particular amount of time is dependent on a number of additional mobile devices being managed by the first cellular base station having uplink signals with signal-to-noise ratios that are less than the interference threshold.

5. A method as recited in claim 1, wherein determining the neighboring cell generating the interference comprises determining a path from the first cellular base stations to the multiple mobile devices and continuing the path past the multiple mobile devices to the next cell encountered in a direction of the path.

6. A method as recited in claim 1, wherein identifying when interference for the multiple mobile devices exceeds the threshold amount is based on a number of the multiple mobile devices that are within a threshold distance of each other.

7. A method as recited in claim 1, wherein the uplink signals are signals that are otherwise used by the mobile device for communication purposes.

8. A computing device of a cellular base station, the computing device comprising:
   a receiver to receive uplink signals from multiple mobile devices being managed by the cellular base station, the multiple mobile devices within a cell associated with the cellular base station;
   an analyzer to analyze signal-to-noise ratios of the uplink signals and identify that two or more of the multiple mobile devices within a threshold distance of each other are being interfered with by more than a threshold amount when the signal-to-noise ratios are less than an interference threshold;
    a locator to determine, based on a location of the two or more of the multiple mobile devices and responsive to the signal-to-noise ratios being less than the interference threshold for at least a particular amount of time, another cell responsible for the interference; and
    a transmitter to send a request to another cellular base station that manages other mobile devices in the other cell responsible for the interference, the request requesting that transmission power of the other mobile devices of the other cell be reduced.

9. A computing device as recited in claim 8, wherein the request requests that transmission power of some of the other mobile devices of the other cell to be reduced.

10. A computing device as recited in claim 8, wherein the analyzer is to generate the signal-to-noise ratios based on the uplink signals received from the multiple mobile devices.

11. A computing device as recited in claim 8, wherein the analyzer is to:
    identify that uplink signals from another of the multiple mobile devices are being interfered with by greater than the threshold amount; and
    reduce the particular amount of time that is exceeded to identify that uplink signals from the two or more of the multiple mobile devices are being interfered with.

12. A computing device as recited in claim 8, wherein the locator is to:
    identify a direction from the cellular base station to the two or more of the multiple mobile devices;
    compare the direction to the two or more of the multiple mobile devices to a cell topology of a cellular communications system that includes the cellular base station; and
    identify the cell responsible for the interference as a closest cell to the two or more of the multiple mobile devices in the identified direction within the cell topology, the closest cell being a different cell than a cell managed by the cellular base station.

13. A computing device as recited in claim 8, wherein the uplink signals are signals that are otherwise used by the multiple mobile devices for communication purposes.

14. A method implemented in a first cellular base station, the method comprising:
    receiving uplink signals from multiple mobile devices located in a first cell being managed by the first cellular base station;
    identifying that the multiple mobile devices are being interfered with by more than a threshold amount when signal-to-noise ratios of the uplink signals are less than an interference threshold amount, the multiple mobile devices being within a threshold distance of each other;
    determining, based on a direction from the first base station to the multiple mobile devices and responsive to the signal-to-noise ratios being less than the interference threshold for at least a particular amount of time, a second cell closest to the mobile device; and
    requesting that a second cellular base station that manages the second cell cause mobile devices of the second cell to reduce their transmission power effective to reduce the interference.

15. A method as recited in claim 14 further comprising generating the signal-to-noise ratios of the uplink signals received from the multiple mobile devices, each of the signal-to-noise ratios being a measure of a power level of the uplink signals relative a power level of interference when the uplink signals are received at the first cellular base station.

16. A method as recited in claim 14, further comprising reducing the particular amount of time that is exceeded to determine that the uplink signals received from the multiple mobile devices are being interfered with in response to determining that signal-to-noise ratios of uplink signals received from another mobile device in the first cell are being interfered with are less than the interference threshold, the multiple mobile devices and the other mobile device being within the threshold distance of each other.

17. A method as recited in claim 14, wherein the uplink signals received from the multiple mobile devices are signals that are received from only mobile devices within a cell being managed by the first cellular base station.

* * * * *